Nov. 21, 1950   J. KUPERUS ET AL   2,531,282
DUAL VOLTAGE POWER SUPPLY
Filed May 10, 1946
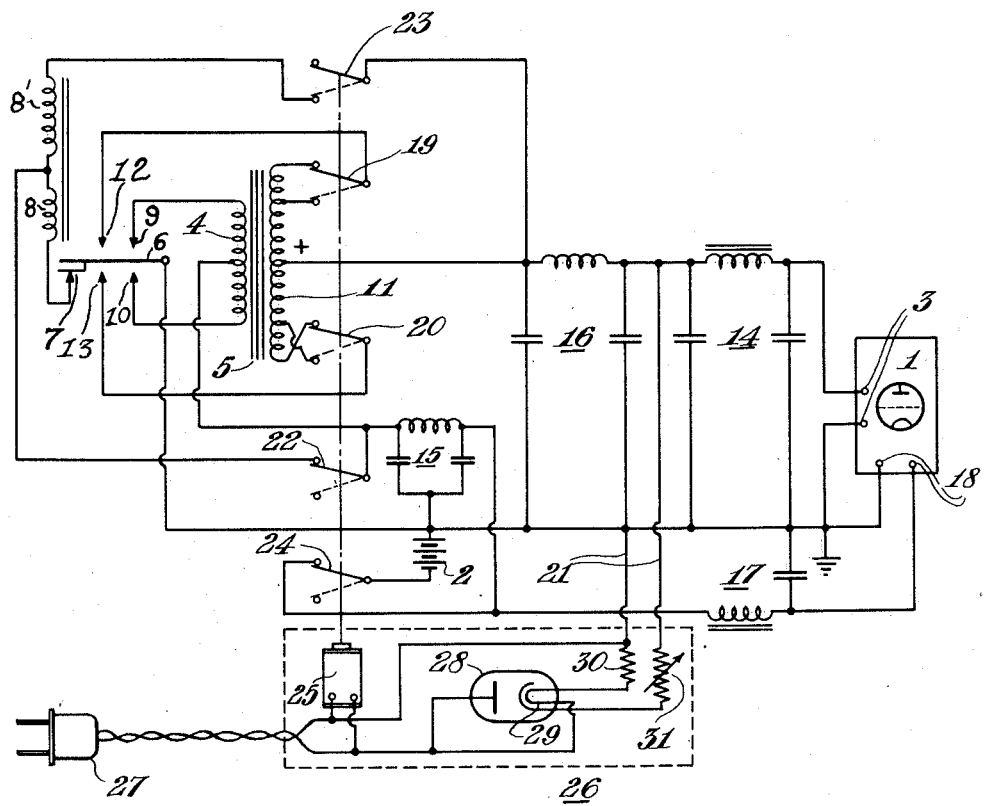
JAN KUPERUS
HENDRIKUS THEODORUS JOZEF WIEGERINCK
INVENTORS.
BY 
ATTORNEY.

Patented Nov. 21, 1950

2,531,282

UNITED STATES PATENT OFFICE 2,531,282

DUAL VOLTAGE POWER SUPPLY

Jan Kuperus and Hendrikus Theodorus Jozef Wiegerinck, Eindhoven, Netherlands, assignors, by mesne assignments, to Hartford National Bank and Trust Company, Hartford, Conn., as trustee Application May 10, 1946, Serial No. 668,698
In the Netherlands June 9, 1941

Section 1, Public Law 690, August 8, 1946
Patent expires June 9, 1961

8 Claims. (Cl. 171—97)

The invention relates to an amplifying device such, for example, as a radio receiving device, which is designed for being supplied from a low-voltage battery, for example an accumulator having a terminal voltage of from about 2 to 12 volts.

With such devices it is known to derive the anode voltage of the amplifying tubes from the battery with the aid of a direct current converter which consists of a vibratory converter for converting the direct voltage taken from the battery into an alternating voltage, a supply transformer for stepping up the alternating voltage and a second vibratory converter for rectifying the alternating voltage which has been stepped up. The heating current of the amplifying tubes is preferably taken, however, directly from the battery.

The contacts of the two mechanical converters are preferably set into vibration by the same spring which is set into vibration in its turn with the aid of an exciting coil which is supplied from the battery through the intermediary of an interrupter contact.

The object of the present invention is to provide an improved arrangement of the above type.

Further objects of the invention will appear from the following description.

According to the invention, the output terminals of the converter are connected to a device for connection to the power network while there is provided a change-over device with the aid of which the ratio of transformation of the supply transformer can be reduced.

By carrying the invention into effect it is always possible, if a power network is available, to save the battery and, as the case may be, even to recharge the latter, which not only frequently renders possible the use of a battery of lower capacity but is also beneficial to the length of life of the battery.

The invention will be explained more fully with reference to the accompanying drawing which represents, by way of example, a particularly advantageous embodiment of a device according to the invention.

Figure 1 denotes a diagrammatically represented amplifying device which is supplied from a low-voltage battery 2. The high voltage required for the supply of the amplifying tubes such, for example, as anode voltage, screen grid voltage and the like, is taken from the battery via a direct current converter and supplied to the connecting terminals 3 of the amplifying device.

The battery terminals are connected to the central tap of the primary winding 4 of a supply transformer 5 and to a spring 6 respectively. The spring 6 is set into vibration with the aid of an exciting coil 8 which is supplied from the battery 2 via an interrupter contact 7. Coil 8 alternately closes contacts 9 and 10 which are provided on either side of the spring 6 and which form part of the first vibratory converter, said contacts being each connected to an end of the primary transformer winding 4. The direct current taken from the battery alternately flows in different directions through the one and the other half of the primary transformer winding with the result that an alternating voltage is induced in the secondary transformer winding 11. The ends of the second transformer winding are connected to interrupter contacts 12 and 13 respectively of a secondary vibratory converter, which contacts are likewise alternately opened and closed by the spring 6 and in synchronism with the contacts 9 and 10 of the first vibratory converter. Across the output terminals of the second converter, which are formed by the spring 6 and the central tap on the secondary winding, there is set up in this case a pulsatory direct voltage. The converter is connected in such manner that the central tap on the secondary transformer winding 11 forms the positive output terminal whereas the negative connecting terminal is earthed. After being smoothed with the aid of a smoothing filter 14, the direct-current voltage taken from the output terminals of the converter is supplied to the connecting terminals 3 of the amplifying device 1.

In order to suppress disturbing high frequency voltages which are set up by the interrupter contacts the input and output terminals of the converter are connected, through the intermediary of filters 15 and 16 respectively, designed for eliminating high-frequency disturbances, to the battery 2 and to the smoothing filter 14 respectively.

With battery-supply of the amplifying device, the low direct voltage of, say, 2 volts is converted with the aid of the above-described converter into a higher direct-current voltage of, say, 110 volts, the ratio of the input and output voltages of the converter being, of course, determined by the ratio of transformation of the transformer 5.

In contradistinction to the anode voltage, the required heating current for the amplifying tubes is taken directly from the battery 2 and supplied, through the intermediary of a smoothing filter 17, to the filaments of the amplifying tubes. These filaments are, for example, connected in parallel and connected to the connecting terminals 10 of the amplifying device.

According to the invention, in the case of supply of the amplifier 1 from a power network, there is supplied to the output terminals of the converter, with the aid of conductors 21, a direct-current voltage which is taken from the network and which corresponds or at least approximately corresponds to the direct-current voltage which occurs in the case of battery supply across the output terminals of the converter. In the case of connection to a direct-current main of, for example, 110 volts, the output terminals of the converter may be connected in principle directly to the main.

The direct-current voltage supplied, in the case of connection to the main, to the output terminals of the converter is supplied via a smoothing filter 14 to the connecting terminals 3 of the amplifying device 1.

Besides, however, if the spring 6 of the converter is set into vibration, the direct-current voltage applied to the output terminals of the converter is converted into a lower direct voltage which approximately corresponds to the terminal voltage of the battery 2 and which, after being smoothed by the filter 17, is supplied to the heating-current connecting terminals 18 of the amplifier 1, the converter being utilized in this case in the reversed sense.

By adjusting switches 19 and 20 into the positions indicated in dotted lines, the contacts 9 and 10 of the second vibratory converter are connected to taps on the secondary transformer winding 11, owing to which the ratio of transformation of the transformer 5 is reduced.

The said tapping points have been so chosen that in the case of main supply there occurs across the input terminals of the converter a voltage which corresponds to the terminal voltage of the battery 2 or slightly exceeds this voltage if the battery is not loaded. In this way a discharge of the battery 2 is avoided or a charge, preferably a so-called drop charge, of the battery may take place. It is true that in this case the heating voltage of the amplifying tubes is slightly higher than in the case of battery supply but this is not a drawback for the present-day amplifying tubes and even for directly heated amplifying tubes.

When carrying the invention into effect the battery may, in the case of main supply, remain switched into a circuit which also permits the circuit of the exciting coil 8 of the converter to be unaltered.

It is in general desirable, however, to construct the device in such manner that, with main supply, the battery can be switched out of circuit with the aid of a switch 24 in order to be able to remove the battery.

Particular steps have to be taken in this case to ensure that upon connection to the main, the converter starts automatically. To that end there is provided in the illustrated device in the battery circuit of the exciting coil 8 a switch 22 which is opened in the case of main supply, while on the core of the exciting coil there is provided an additional winding 8' which is connected in series with the winding 8 and one of which may be connected to the positive output terminal of the converter by closing a switch 23. With main supply the exciting coil is excited in this case by the direct current taken from the main, while, in view of the appreciably higher value of the supply voltage, the winding 8' preferably has a high ohmic resistance in order to restrict the exciting current of the windings 8 and 8'. In this case a particular series-resistance is unnecessary and, moreover, the exciting current may be appreciably lower than with battery supply.

The device may be constructed in such manner that upon its connection to a power network, the said switches 19, 20, 22, 23, 24 are automatically thrown, with the aid of a relay 25 connected to the connecting terminals of the network, into the positions indicated by dotted lines. It is, however, simpler to so arrange the circuit that the relay 25 will act exclusively on the contact 24 so that, upon connection to the power network, the battery is switched out of the circuit while the switches 19, 20, 22 and 23 may be shifted with the aid of a single hand-operated knob. If then, upon connection to the network, the switches 19, 20, 22, 23 occupy the positions required for battery supply, the battery is switched out of the circuit and the converter does not start automatically, the operator being thus compelled to throw in the switches 19, 20, 22 and 23. Throwing the switches 19 and 20 to the position shown in dashed lines changes the turns ratio between the windings 11 and 4 of the transformer 5. Closing the switch 23 connects the positive terminal of the high voltage supply through the coils 8' and 8, the make and break contact 7 and the spring 6 to the negative (ground) terminal of the high voltage supply. By opening the switch 22 the battery 2 is disconnected from the coil 8. With the switches 19, 20, 23 and 22 so positioned the ground terminal of the high voltage supply is alternately connected through the contacts 12 and 13 to one or the other half of the winding 11 of the transformer 5. Under these conditions an alternating voltage is induced in the winding 4 of the transformer 5 and this induced voltage is rectified by the contacts 9 and 10 in synchronism with the changes in current through the winding 11 and applied to the low voltage terminals of amplifier 1 through the conductors connected to the spring 6 and the center tap of the winding 4 and through the filter 17. The spring 6 is caused to vibrate by means of the current flowing through the coils 8' and 8 from the high voltage supply.

It is thus seen that when the amplifier 1 is to be energized from the battery 2, the filament supply for the amplifier is derived directly from the battery and the anode supply is similarly derived from the battery 2 through the transformer 5 and its associated interruption and rectifying contacts. When the amplifier 1 is to be energized from the mains, the anode supply is derived directly from the high voltage supply 26 and the filament supply for the amplifier is similarly derived from the high voltage supply through the transformer 5 and the associated interruption and rectifying contacts. In this latter connection it will be noted that the contacts 9 and 10 serve as rectifying elements and the contacts 12 and 13 serve as interruption elements which is the reverse role of these contacts when the amplifier 1 is energized by the battery 2.

As pointed out above, it is preferred that the battery 2 be disconnected from the circuit when the amplifier 1 is energized from the mains and this result is achieved by the relay coil 25 which opens the switch 24 when the current from the mains is applied to the coil 25.

In the device represented the mains supply device 26 (indicated by a dotted line) with a connecting plug 27 and output terminals 21 comprises, in addition to the relay 25, a rectifying tube 28 whose filament 29 is supplied directly from the main with the interposition of a resistance 30.

The use of a rectifier in the main supply device offers the advantage that, upon connection to a direct-current main, in the case of a wrong polarity of the plug 27 deterioration of electrolytic condensers utilized in the smoothing filter 14 and of any polarity responsive elements which may be present in the amplifier is avoided while, in addition, the device may be supplied from an alternating current main.

For the exact adjustment of the required output voltage, more particularly with different direct or alternating-current supply voltages of the main supply device 26, an adjustable resistance 31 is mounted in series with the rectifying tube 28.

It may be observed that the output conductors 21 of the main supply device 26 are connected between the two smoothing filters 13 and 14. This offers the advantage that the filter 16 for eliminating high-frequency disturbances prevents disturbing voltages of high-frequency nature which are generated by the converter from being transferred to the power network while the smoothing filter 14 is utilized both in the case of battery and of main supply.

What we claim is:

1. An electrical circuit arrangement for producing a first direct current potential having a first given value and a second direct current potential having a second given value, comprising a transformer having a first winding and a second winding, a first source of a first voltage having a value substantially equal to said first given value, a second source of a second voltage having a value substantially equal to said second given value, first current interruption means interposed between said first source and said first winding, second current interruption means interposed between said second source and said second winding, electromagnetic means for actuating said first and second interruption means in synchronism, and means to connect said first and second sources to said electromagnetic means to energize said electromagnetic means.

2. An electrical circuit arrangement for producing a first direct current potential having a first given value and a second direct current potential having a second given value, comprising a transformer having a first winding and having a second winding provided with end terminals and an intermediate tapping terminal, a first source of a first voltage having a value substantially equal to said first given value, a second source of a second voltage having a value substantially equal to said second given value, first current interruption means interposed between said first source and said first winding, second current interruption means, means to connect said second source to one of said end terminals and to said second interruption means, means to selectively connect said second interruption means to the other of said end terminals and to said tapping terminal, electromagnetic means for actuating said first and second interruption means in synchronism, and means to connect said first and second sources to said electromagnetic means to energize said electromagnetic means.

3. An electrical circuit arrangement for producing a first direct current potential having a first given value and a second direct current potential having a second given value, comprising a transformer having a first winding and a second winding, a first source of a first voltage having a value substantially equal to said first given value, a second source of a second voltage having a value substantially equal to said second given value, first current interruption means interposed between said first source and said first winding, second current interruption means interposed between said second source and said second winding, electromagnetic means for actuating said first and second interruption means in synchronism, a first switch member interposed between said first source and said electromagnetic means, a second switch member interposed between said second source and said electromagnetic means, and means to actuate said switch members to selectively energize said electromagnetic means.

4. An electrical circuit arrangement for producing a first direct current potential having a first given value and a second direct current potential having a second given value, comprising a transformer having a first winding and a second winding, a first source of a first voltage having a value substantially equal to said first given value, a second source of a second voltage having a value substantially equal to said second given value, first current interruption means interposed between said first source and said first winding, second current interruption means interposed between said second source and said second winding, electromagnetic means for actuating said first and second interruption means in synchronism and comprising a first coil and a second coil connected in series relationship, a first switch member interposed between said first source and the junction of said coils, a second switch member interposed between said second source and said coils in series, and means to actuate said switch members to selectively energize said electromagnetic means.

5. An electrical circuit arrangement for producing a first direct current potential having a first given value and a second direct current potential having a second given value, comprising a transformer having a first winding provided with end terminals and a center tapping terminal and having a second winding provided with end terminals, a center tapping terminal and tapping terminals intermediate to said center terminal and said end terminals, a first source of a first voltage having a value substantially equal to said first given value, means to connect said first source to the said center terminal of said first winding, a second source of a second voltage having a value substantially equal to said second given value, means to connect said second source to the said center terminal of said second winding, first current interruption means interconnecting said first source to the end terminals alternately of said first winding, first and second switch means each selectively connected to one of said end terminals and to one of said intermediate terminals of said second winding, second current interruption means interconnecting said second source to said switch means alternately, electromagnetic means for actuating said first and second interruption means in synchronism and comprising a first coil and a second coil connected in series relationship, third switch means interposed between said first source and the junction of said coils, fourth switch means interposed between said second source and said coils in series, and means to actuate said third and fourth switch means to selectively energize said electromagnetic means.

6. An electrical circuit arrangement for producing a first direct current potential having a first given value and a second direct current potential having a second given value, comprising a transformer having a first winding provided with end terminals and a center tapping terminal and having a second winding provided with end terminals, a center tapping terminal and tapping terminals intermediate to said center terminal and said end terminals, a first source of a first voltage having a value substantially equal to said first given value, means to connect said first source to the said center terminal of said first winding, a second source of a second voltage having a value substantially equal to said second given value, means to connect said second source to the said center terminal of said second winding, first current interruption means interconnecting said first source to the end terminals alternately of said first winding, first and second switch means each selectively connected to one of said end terminals and to one of said intermediate terminals of said second winding, second current interruption means interconnecting said second source to said switch means alternately, electromagnetic means for actuating said first and second interruption means in synchronism and comprising a first coil and a second coil connected in series relationship, third switch means interposed between said first source and the junction of said coils, fourth switch means interposed between the said second source and said coils in series, means to actuate said third and fourth switch means to selectively energize said electromagnetic means, first high frequency filter means interposed between said first source and said first interruption means, and second high frequency filter means interposed between said second source and said second interruption means.

7. An electrical circuit arrangement for producing a first direct current potential having a first given value and a second direct current potential having a second given value, comprising a transformer having a first winding provided with end terminals and a center tapping terminal and having a second winding provided with end terminals, a center tapping terminal and tapping terminals intermediate to said center terminal and said end terminals, a first source of a first voltage having a value substantially equal to said first given value, means to connect said first source to the said center terminal of said first winding, a second source of a second voltage having a value substantially equal to said second given value, means to connect said second source to the said center terminal of said second winding, first current interruption means interconnecting said first source to the end terminals alternately of said first winding, first and second switch means each selectively connected to one of said end terminals and to one of said intermediate terminals of said second winding, second current interruption means interconnecting said second source to said switch means alternately, electromagnetic means for actuating said first and second interruption means in synchronism and comprising a first coil and a second coil connected in series relationship, third switch means interposed between said first source and the junction of said coils, fourth switch means interposed between said second source and said coils in series, means to actuate said third and fourth switch means to selectively energize said electromagnetic means, second electromagnetic means coupled to said second source, and switching means actuated by said second electromagnetic means to disconnect said first source from said first interruption means.

8. An electrical circuit arrangement for producing a first direct current potential having a first given value and a second direct current potential having a second given value, comprising first and second pairs of output terminals for said first and second potentials respectively, a transformer having a first winding provided with end terminals and a center tapping terminal and having a second winding provided with end terminals, a center tapping terminal and tapping terminals intermediate to said center terminal and said end terminals, a battery having a voltage value substantially equal to said first given value, means to connect one terminal of the battery to the center terminal of said first winding, a rectifier source of a second voltage having a value substantially equal to said second given value, means to connect one terminal of the rectifier source to the said center terminal of said second winding, an electrically conducting vibratory element, a first pair of contacts arranged on opposite sides of and alternately engaged by said vibratory element, means to connect said pair of contacts each to one of said end terminals of said first winding, first and second switch means each selectively connected to one of said end terminals and to one of said intermediate terminals of said second winding, a second pair of contacts arranged on opposite sides of and alternately engaged by said vibratory element means to connect said second pair of contacts each to one of said switching means, electromagnetic means for actuating said vibratory element and comprising a first coil and a second coil connected in series relationship, third switch means interposed between said battery and the junction of said coils, fourth switch means interposed between said rectifier source and said coils in series, means to connect the said center terminal of said second winding and the vibratory element to said second pair of output terminals, and means to actuate said first, second, third and fourth switch means to simultaneously connect said first and second switch means to said end terminals, to close said third switch means and to open said fourth switch means and to simultaneously connect said first and second switch means to said intermediate terminals, to open said third switch means and to close said fourth switch means.

JAN KUPERUS.
HENDRIKUS THEODORUS JOZEF
WIEGERINCK.

(References on following page)

REFERENCES CITED

The following references are of record in the file of this patent:

UNITED STATES PATENTS

| Number | Name | Date |
|---|---|---|
| 2,063,311 | Guedon et al. | Dec. 8, 1936 |
| 2,121,421 | Burt | June 21, 1938 |
| 2,190,317 | Holst | Feb. 13, 1940 |
| 2,240,123 | Shoup | Apr. 29, 1941 |
| 2,273,709 | Jones | Feb. 17, 1942 |

FOREIGN PATENTS

| Number | Country | Date |
|---|---|---|
| 492,908 | Great Britain | Apr. 5, 1937 |

Certificate of Correction

Patent No. 2,531,282 November 21, 1950

JAN KUPERUS ET AL.

It is hereby certified that error appears in the printed specification of the above numbered patent requiring correction as follows:

Column 2, line 21, for the word "second" read *secondary*; line 23, for "secondary" read *second*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*